(12) United States Patent
Kao

(10) Patent No.: US 7,962,476 B2
(45) Date of Patent: Jun. 14, 2011

(54) METHOD AND APPARATUS FOR PERFORMING A DEPTH-FIRST JOIN IN A DATABASE

(75) Inventor: Harry Kao, Pasadena, CA (US)

(73) Assignee: Applied Minds, Inc., Glendale, CA (US)

( * ) Notice: Subject to any disclaimer, the term of this patent is extended or adjusted under 35 U.S.C. 154(b) by 316 days.

(21) Appl. No.: 11/828,221

(22) Filed: Jul. 25, 2007

(65) Prior Publication Data

US 2008/0027906 A1 Jan. 31, 2008

Related U.S. Application Data

(60) Provisional application No. 60/820,449, filed on Jul. 26, 2006.

(51) Int. Cl.
*G06F 7/00* (2006.01)
*G06F 17/30* (2006.01)

(52) U.S. Cl. .................. 707/718; 707/716

(58) Field of Classification Search .......... None
See application file for complete search history.

(56) References Cited

U.S. PATENT DOCUMENTS

| | | | |
|---|---|---|---|
| 5,551,031 A * | 8/1996 | Cheng et al. | 707/2 |
| 5,592,668 A * | 1/1997 | Harding et al. | 707/2 |
| 5,694,598 A * | 12/1997 | Durand et al. | 707/103 R |
| 5,761,654 A * | 6/1998 | Tow | 707/2 |
| 5,963,933 A * | 10/1999 | Cheng et al. | 707/2 |
| 5,991,754 A * | 11/1999 | Raitto et al. | 707/2 |
| 6,374,263 B1 * | 4/2002 | Bunger et al. | 707/201 |
| 6,748,392 B1 * | 6/2004 | Galindo-Legaria et al. | 707/102 |
| 7,184,998 B2 * | 2/2007 | Nica | 707/2 |
| 2004/0006561 A1 * | 1/2004 | Nica | 707/3 |
| 2008/0027906 A1 * | 1/2008 | Kao | 707/2 |

FOREIGN PATENT DOCUMENTS

EP 1492034 A2 * 12/2004

OTHER PUBLICATIONS

César Galindo-Legaria, Arnon Rosenthal, Outerjoin simplification and reordering for query optimization, ACM Transactions on Database Systems (TODS) 1997, vol. 22, Issue 1, pp. 43-74 retrieved from ACM digital library.*

* cited by examiner

*Primary Examiner* — Sathyanarayan Pannala
(74) *Attorney, Agent, or Firm* — Michael A. Glenn; Glenn Patent Group

(57) ABSTRACT

In a database, inner joins are performed in a depth-first manner. Depth-first joins differ from breadth-first joins in that rows are examined a page at a time during execution from every table that is participating in the query. Thus, the depth-first join is a constant-space operation with respect to the size of the data set, with the storage required approximately equal to the sum of the sizes of a page from each table.

22 Claims, 4 Drawing Sheets

METHOD AND APPARATUS FOR PERFORMING A DEPTH-FIRST JOIN IN A DATABASE

CROSS REFERENCE TO RELATED APPLICATION

This application claims priority to U.S. provisional application, Ser. No. 60/820,449 filed Jul. 26, 2006, which is incorporated herein in its entirety by this reference thereto.

BACKGROUND OF THE INVENTION

1. Techinal Field

The invention relates to databases. More particularly, the invention relates to a depth-first join for a database.

2. Description of the Prior Art

In databases, a join is a type of query that combines data from multiple tables. Inner joins are a subclass of joins that project the results of a set of restrictions applied to the Cartesian product of all rows in the participating tables. Existing commercial databases execute joins in a breadth-first manner. Typically, a query optimizer examines the request and applies heuristics to generate a query execution plan which describes, among other things, the order in which the tables are to be combined (joined) to obtain the result set. Tables are joined in a pairwise manner. The result of the combination of two tables is itself a table. In general, the combination of N tables requires N−1 join steps. At each step, the candidate rows are extracted from both tables and combined.

A disadvantage of the breadth-first join is that the storage requirements for the intermediate tables grow with database size. It is conceivable that the temporary storage required for a join in a large, distributed database could overwhelm the resources of a single machine. To ensure adequate performance on very large data sets, it would be desirable to employ a technique for performing a join using a constant-space mechanism with an asymptotic time complexity that is no worse than a traditional breadth-first join.

SUMMARY OF THE INVENTION

The invention provides a method and apparatus for performing inner joins in a depth-first manner. Depth-first joins differ from breadth-first joins in that rows are examined a page at a time during execution from every table that is participating in the query. Thus, the depth-first join is a constant-space operation with respect to the size of the data set, with the storage required approximately equal to the sum of the sizes of a page from each table.

DETAILED DESCRIPTION OF THE INVENTION

Figure 1:
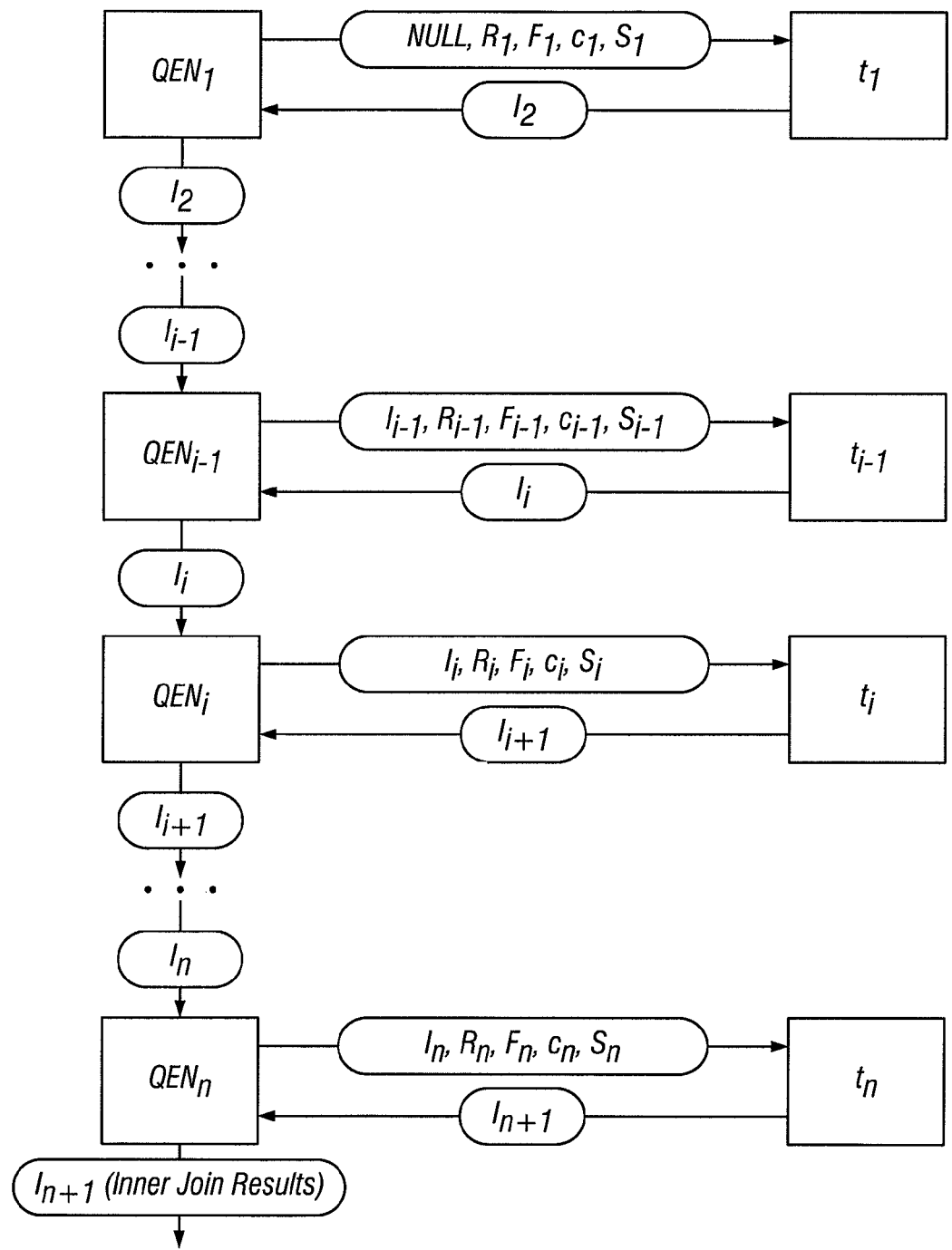
FIG. 1 is a flow diagram that shows a generalized QEN chain according to the invention.

The invention provides a method and apparatus, comprising a computer including a storage, for performing inner joins in a depth-first manner. Depth-first joins differ from breadth-first joins in that rows are examined a page at a time during execution from every table that is participating in the query. Thus, the depth-first join is a constant-space operation with respect to the size of the data set, with the storage required approximately equal to the sum of the sizes of a page from each table.

Formal Description of Inner Joins

An inner join is defined by:

A set of tables T that participate in the inner join. A table can participate in an inner join more than once if it is first renamed. The semantics of renaming a table are not described here.

A set of field names F from the tables in T that indicate which fields should appear in the result table.

A set of restrictions R that operate on fields from the tables in T. The set of restrictions may be empty, in which case the result of the restriction operation is the Cartesian product of the tables.

The definition of a restriction herein is more general than those of traditional databases; we allow arbitrary operators of non-zero arity. For purposes of the discussion herein, a restriction is defined by:

A set of k field names $F_r$ from the tables in T that indicate which fields participate in the restriction.

A k-ary function θ that takes the values of the fields indicated by $F_r$ as arguments and returns a truth value.

To apply a restriction R to a row r is to call θ with the field values in r indicated by $F_r$ to determine whether R is satisfied. This operation is denoted R(r).

Let n=|T| and $J_0 = t_1 \times \ldots \times t_n$, the Cartesian product of all tables in T. Define $J_i = \{r : r \in J_{i-1} \wedge R_i(r)\}$ as the set of rows from $J_{i-1}$ that satisfy the ith restriction. The result of the inner join is $\Pi_F(J_n)$, a table containing the rows in $J_n$ projected onto the columns indicated by F. Optionally, all duplicate rows are removed. For purposes of the discussion herein, a field is a portion of a row that is indicated by a name, while a column comprises all fields of a given name in a table or a set or rows; the terms field name and column name are equivalent.

Query Execution Nodes

The invention comprises a set of Query Execution Nodes (QEN) that are connected to each other in a chain. There exists one QEN for each participating table. Each QEN is associated with a table and is responsible for performing single-table queries against it.

The chain works as an assembly line with each QEN requesting rows from the previous QEN, sending them as an argument to single-table queries against its associated table, and passing the resulting rows to the next QEN in the chain. The solution to the inner join comprises the rows returned by the last QEN.

Description of Single-Table Queries

A single-table query against a table t is defined by a 5-tuple, (I, $R_q$, $F_p$, c, S), where:

I is an optional set of input rows.

$R_q$ is a set of restrictions that operate on the fields indicated by $F_I \cup F_t$, where $F_I$ and $F_t$ are the sets of field names from I and t, respectively.

$F_p$ is a set of field names from $F_I \cup F_t$ indicating the columns onto which the resulting rows should be projected.

c is a Boolean value indicating whether duplicate rows should be culled from the single-table query result.

S is an optional sequence of field names specifying the relative significance of the fields indicated by $F_p$ in determining the lexicographical ordering of the results of the single-table query. If this is not provided, the result will not be sorted.

Paging parameters may also be supplied to specify which portion of the single-table query result to retrieve:

A marker indicating the beginning of the page.

A page size p indicating the number of rows to return.

The full (non-paged) single-table query result set comprises the rows in I⋈t that satisfy all r∈$R_q$, projected onto $F_p$, with duplicates removed if c is true, sorted according to S, if provided. Paging operates as described in the related United States Patent application entitled *Data Store with Lock-Free Stateless Paging Capability*, filed 2005-12-12.

QEN Chain Construction

Constructing a QEN chain requires the definition of each QEN's inputs and outputs as well as the association of every restriction in R with a QEN. We begin with a sequence of participating tables $(t_1, t_2, \ldots, t_n)$ and proceed iteratively from the first table to the last. The ordering of tables is permitted to be arbitrary. In practice, it would likely be ordered to optimize performance.

We define the following:

An unused restriction is a member of R that has not yet been associated with a QEN in a previous iteration.

The fields of interest for iteration n, $F_n$, is the set of fields that either exist in F or exist in $F_r$ of one of the unused restrictions.

Base Case $R_1$ contains all restrictions that can be applied using only the fields from $t_1$. In response to a request for a page of rows, $QEN_1$ returns the result of a single-table query issued against $t_1$ of the form $(\emptyset, R_1, F_1, \text{false}, \emptyset)$.

Inductive Case $R_i$ contains all unused restrictions that can be applied using only the fields from $t_i$ and $F_{i-1}$. Let $I_i$ be a page of data received from $QEN_{i-1}$. In response to a request for a page of rows, $QEN_i$ returns the result of a single-table query issued against $t_i$ of the form $(I_i, R_i, F_i, \text{false}, \emptyset)$.

Invariants

Upon completion of the QEN chain, the following is true:
No unused restrictions remain.
$F = F_n$ and the rows returned by $QEN_n$ are the result of the inner join.

The resulting QEN chain is illustrated in FIG. 1.

Example Query

The depth-first join is best illustrated through a specific example query in which there are three tables: person, vehicle, and pet, with semantic mappings

| | |
|---|---|
| person : | {name, hometown, birth date} |
| vehicle : | {model, color, owner} |
| pet : | {name, species, owner}. |

The example query requests the names of dogs and the names of their owners who drive red vehicles. In SQL syntax, the query can be posed with the statement:

```
SELECT
    person.name, pet.name
FROM
    person, vehicle, pet
WHERE
    person.name =      vehicle.owner
    person.name =      pet.owner
    vehicle.color = "red"
    pet.species = "dog"
ORDER BY
    person.name, pet.name
```

Figure 2:
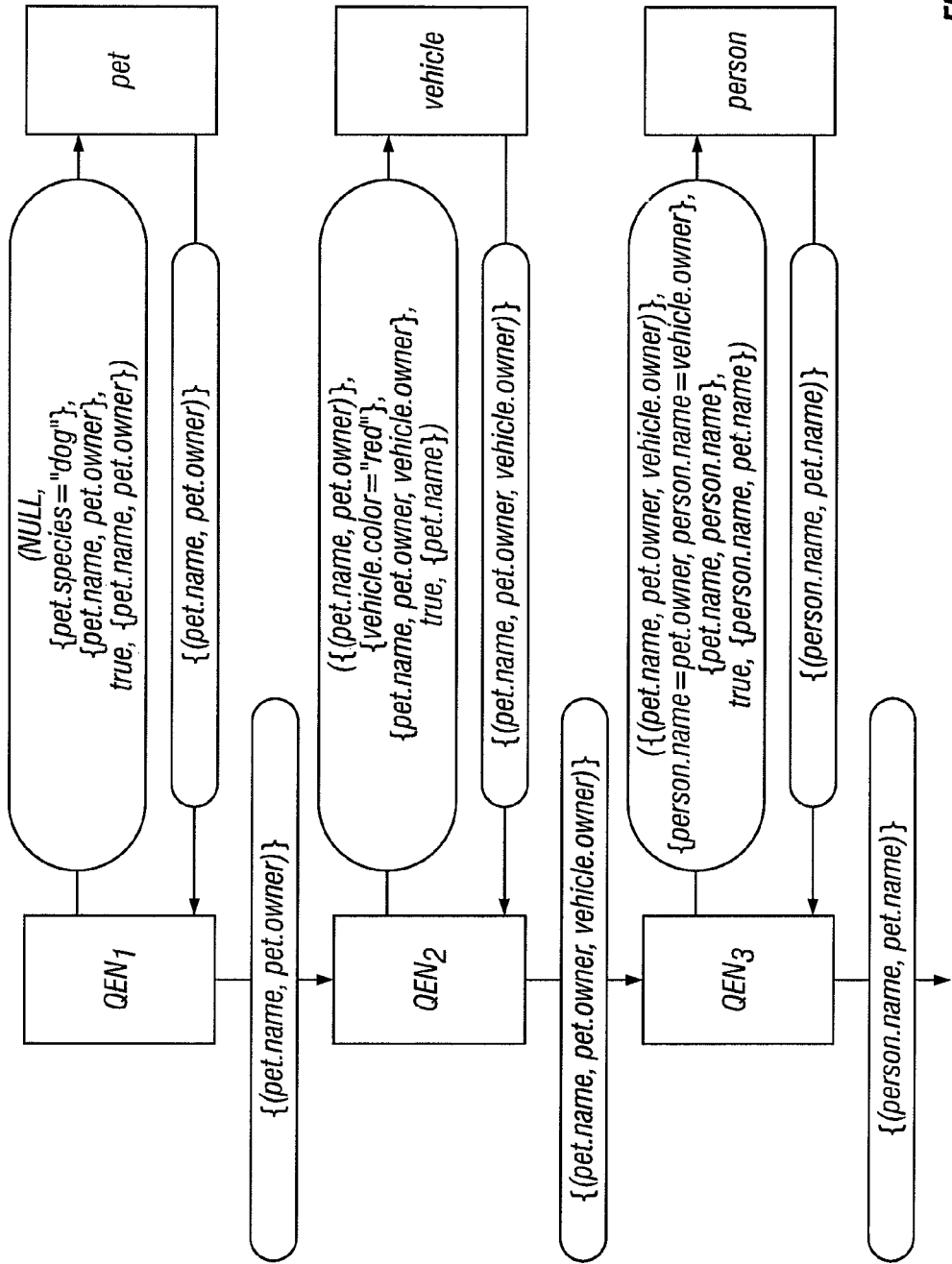
FIG. 2 is a flow diagram that shows one possible QEN chain for an example query according to the invention.

FIG. 2 is a flow diagram that shows one possible QEN chain for the example query. For each QEN, FIG. 2 shows the five arguments of the single table query (I, $R_q$, $F_p$, c, S) and the output rows G returned by the table and passed to the next QEN in the chain.

Duplicate Culling in QENs

Culling Duplicates within a Single-Table Query

It is often desirable to remove duplicate rows from the result of an inner join. As noted, the 5-tuple defining a single-table query includes a Boolean argument c. If c=true, the pages of rows returned for a single-table query contain no duplicates. This provision alone, however, does not ensure that no duplicate rows appear within the result of an inner join.

Culling Duplicates Across Single-Table Queries

Projection and Duplicates

Let a and b be two rows from the same table t containing the fields $F_t$. Let $F_v$ be the set of all field names from t where the value of that field is the same in a and b. If $F_v \neq \emptyset$, then $\Pi_{F_\gamma}(a) = \Pi_{F_\gamma}(b)$ for all $F_\gamma: F_\gamma \subseteq F_v$. Thus, duplicates arise when projection removes the columns that make two rows unique with respect to one another.

Let $Q_\alpha = (I_\alpha, x, y, \text{true}, z)$ and $Q_\beta(I_\beta, x, y, \text{true}, z)$ be two queries submitted by a QEN to its associated table in fulfilling an inner join. Although $Q_\alpha$ and $Q_\beta$ share a similar form and differ only in their input rows, they are in fact different queries. Specifically, due to the nature of the projection operation described above, it cannot be assumed that the results of $Q_\alpha$ and $Q_\beta$ are disjoint, even if $I_\alpha$ and $I_\beta$ are disjoint.

Thus, uniqueness of the rows within the results for each single-table query does not imply uniqueness of all rows within all pages that are returned by a QEN. The QEN must take additional steps to remove any duplicates that arise across the pages of results obtained in response to separate single-table queries.

Sorting

Because the depth-first join is intended to be a constant-space algorithm, a QEN must remove duplicates arising across single-table queries despite a very limited capacity to store information. Accordingly, a preferred approach to addressing the problem of duplicates arising across single-table queries is to manipulate the sort order of the rows so that duplicates appear adjacent to each other in the sequence of all rows across all pages. This reduces the amount of storage required and also simplifies the culling operation, because identical rows can easily be collapsed onto one.

Suppose there exists a set of rows G comprising a set of fields $F_G$ that is sorted according to $S = (S_1, \ldots, S_{|F_G|})$. A projection onto a set of columns $F_p$ results in the removal of columns $F_c = F_G - F_p$. We define the set of unperturbed fields as follows: $F_u = \{S_i : S_i \notin F_c \land (i=1 \lor S_{i-1} \in F_u)\}$. The unperturbed fields can also be described as those fields $\{S_1, \ldots, S_{|F_u|}\}$ in S by which the rows remain sorted after the projection.

All duplicates of a row must be within the group of rows, potentially returned by separate single-table queries, with unperturbed field values equaling those of the row. A QEN must collect all rows within this unperturbed group, sort them, and remove the duplicates.

The cardinality of sets of rows with identical unperturbed fields can be minimized by judicious ordering of the participating tables when generating the QEN chain and careful choice of S and $F_p$ for each QEN to further increasing the locality of duplicates. This document does not discuss locality optimization in detail. However, one would typically wish to keep stable fields near the beginning of S, avoid reordering columns, and append columns to the end of S.

Backtracking

Duplicate culling requires the examination of all rows in a group that have identical unperturbed fields before any row within the group can be passed to the next QEN in the QEN chain.

Let $\zeta_i(I_i)$ represent the operations (restricting, projecting, sorting, and culling) performed on a set of input tuples when $QEN_i$ issues a single-table query against its table. Let $G_{i-1}$ be a group of rows from $QEN_{i-1}$, potentially obtained by $QEN_{i-1}$ through multiple single-table queries and passed to $QEN_i$ within multiple pages, for which $\zeta_i(G_{i-1})$ results in a complete set of rows with identical unperturbed fields.

$QEN_i$ can store only a finite number of rows from $QEN_{i-1}$. But, $|G_{i-1}|$ cannot be bounded because it depends on the data set size, as well as the data distribution. For $QEN_i$ to examine the entire group, it may need to request successive pages of $G_{i-1}$ from $QEN_{i-1}$. However, $|\zeta_i(G_{i-1})|$ also cannot be bounded, and there exists the possibility that $\zeta_i(G_{i-1})$ cannot be passed to $QEN_{i+1}$ in a single page. Thus, when $QEN_{i-1}$ requests the next page of $\zeta_i(G_{i-1})$, $QEN_i$ must once again examine all of $G_{i-1}$.

Re-examining all of $G_{i-1}$ requires that $QEN_i$ request from $QEN_{i-1}$ a page of rows that it has already provided. To achieve this, there must exist a mechanism to explicitly set a QEN's position in its output stream. This approach is called backtracking because it allows a QEN to seek backwards and output rows that it has already returned.

Reference QEN Implementation

Figure 3:
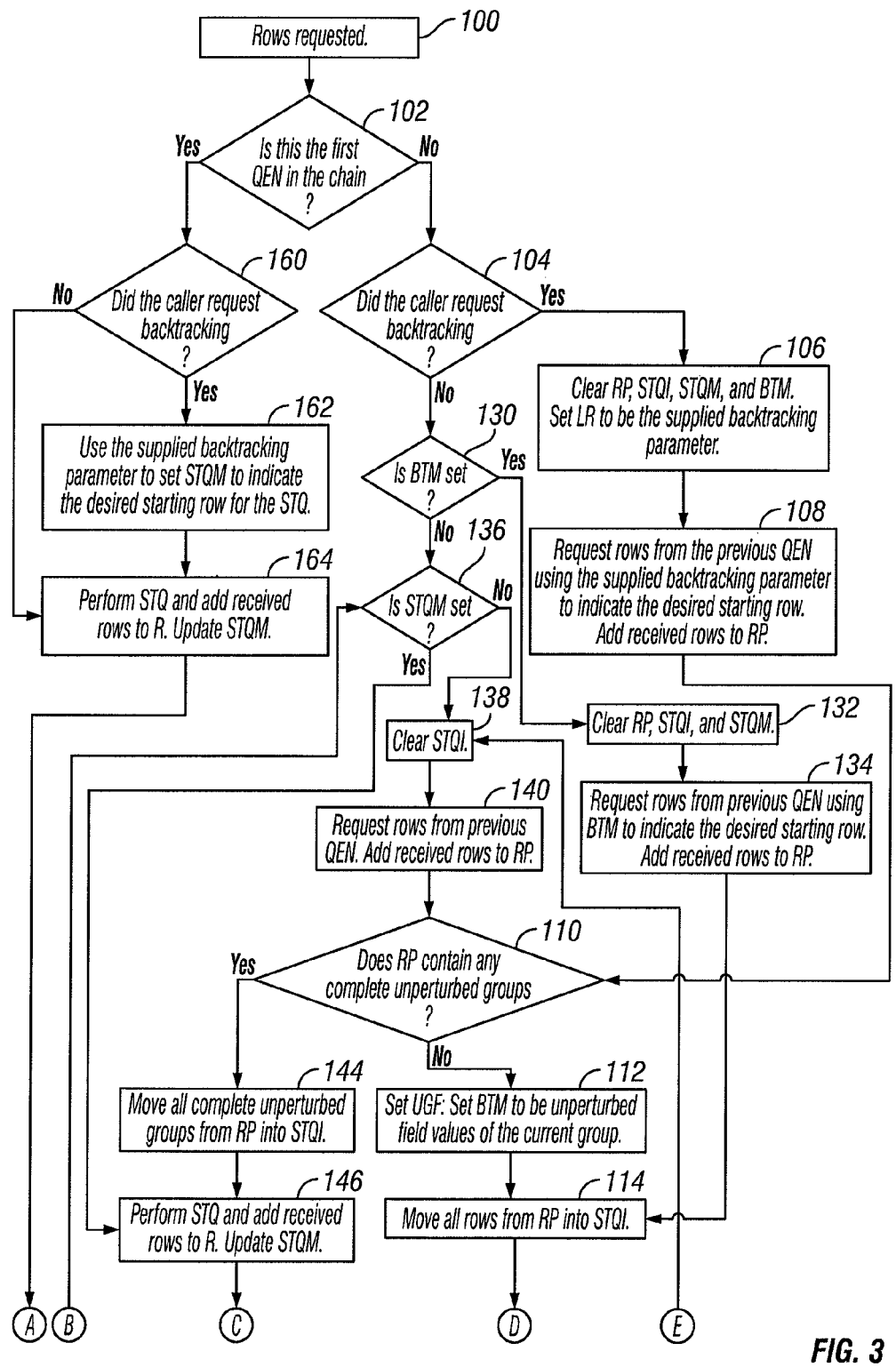
FIG. 3 is a flow diagram showing a preferred implementation of a QEN for performing a depth-first join in a database according to the invention.
Figure 3:
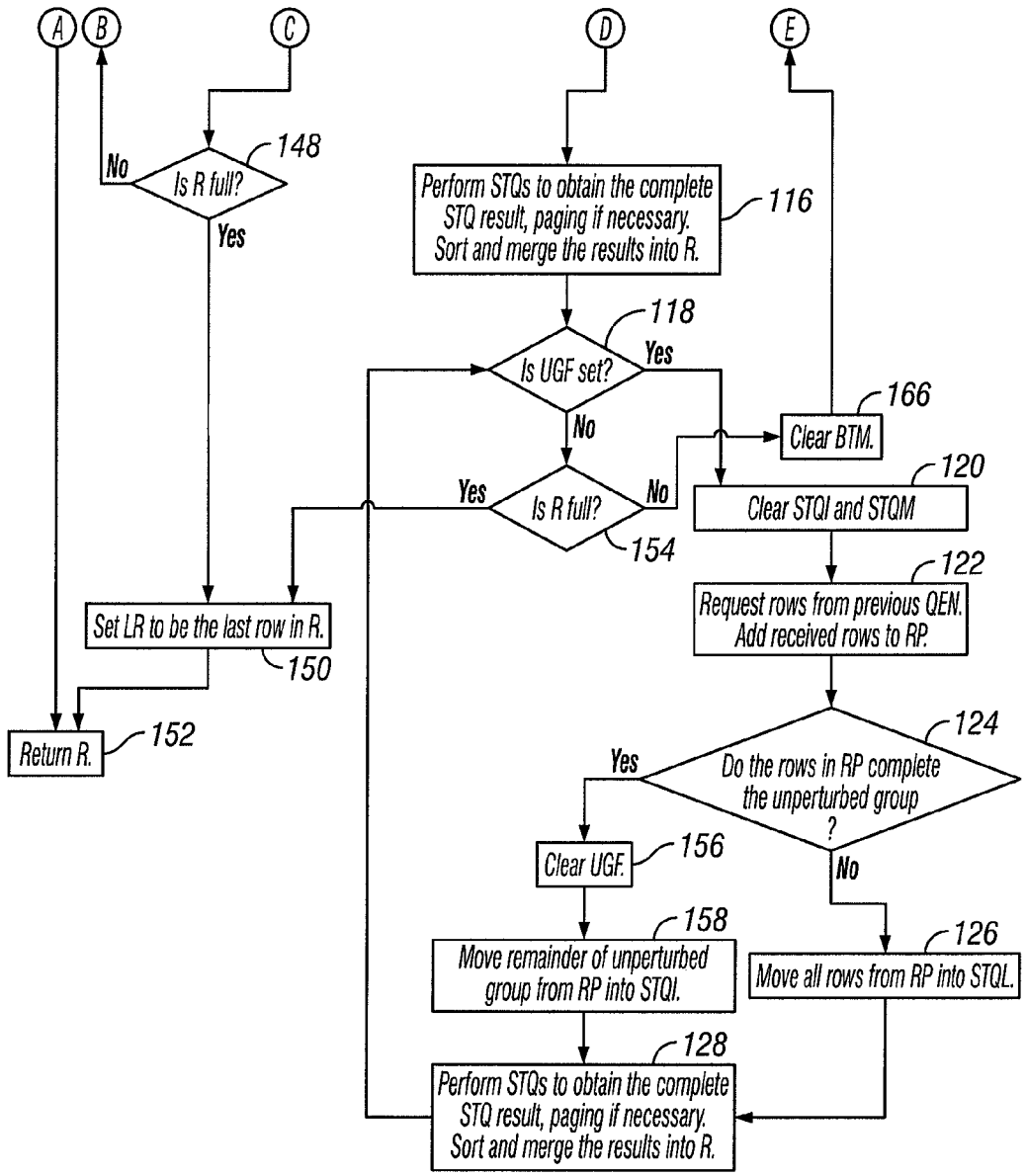

FIG. 3 is a flow diagram showing a preferred implementation of a QEN for performing a depth-first join in a relational database according to the invention. In FIG. 3, the QEN provides duplicate culling as described above.

The QEN maintains a persistent state across requests that comprises:
RP, a page of rows obtained by performing a request against the previous QEN.
STQI, a page of rows from the previous QEN that is currently being used as an input parameter for a single-table query. A row is never in both RP and STQI at the same time.
STQM, a paging marker used for single-table queries against the QEN's table.
LR, the last row that was returned to the caller. This is used to prevent duplicates from being returned when merging rows into the result page while backtracking.
BTM, a marker containing the field values of the current unperturbed group that is set when in backtracking mode.

The QEN also has a transient state that is kept for the duration of a single request. This consists of:
R, the page of results that will be returned to the caller.
UGF, a flag that is set when iterating through pages of a complete unperturbed group.

In FIG. 3, the process starts when rows are requested (100). A determination is made if this is the first QEN in the chain (102). If it is, then a determination is made if the caller requested backtracking (160). If the caller requested backtracking, then the process uses the supplied backtracking parameter to set STQM to indicate the desired starting row for the single-table query (STQ) (162). In either event, i.e. backtracking requested or not requested, the process performs STQ and adds received rows to R; STQM is also updated (164). The process then returns R (152).

If this is not the first QEN in the chain (102), then a determination is made if the Caller requested backtracking (104).

If the caller requested backtracking (104), then R, STQL, STQM, and BTM are cleared and LR is set to the supplied backtracking parameter (106). Rows are then requested from the previous QEN using the supplied backtracking parameter to indicate the desired starting row, and received rows are added to RP (108). A determination is then made if the RP contains any complete, unperturbed groups (110). If no, then the UGF is set. Specifically, the BTM is set to be the unperturbed field values of the current group (112). If RP contains complete, unperturbed groups, then all complete, unperturbed groups are moved from RP into STQI (144). STQ is then performed, received rows are added to R, and STQM is updated (146). A determination is then made if R is full (148). If R is full, then LR is set to be the last row in R (150) and R is returned (152). If R is not full, then the process returns to determine if STQM is set (136). If it is not, then STQI is cleared (138), and rows are requested from the previous QEN and added to RP (140) and the process continues from step (110), as described above.

If the caller did not request backtracking (104), then a determination is made if the BTM is set (130).

If the BTM is set (130), then RP, STQI, and STQM are cleared (132), and rows are requested from the previous QEN using BTM to indicate the desired starting row; received rows are added to RP (134). All rows are then moved from RP to STQI (114). STQs are then performed to obtain the complete SRTQ result, paging if necessary, and the results are sorted and merged into R (116).

A determination is then made if the UGF is set (118). If it is, then STQI and STQM are cleared (120); and rows are requested from the previous QEN and added to RP (122). A determination is made if the rows in the RP complete the unperturbed group (124). If so, the UGF is cleared (156), the remainder of the unperturbed group is moved from RP into STQI (158), and STQs are performed to obtain the complete STQ result, paging if necessary. The results are then sent and merged into R (128) and the process returns to determine if UGF is set (118). If the rows in the RP do not complete the unperturbed group (124), then all rows are moved from RP into STQI (126), and STQs are performed to obtain the complete STQ result, paging if necessary. The results are then sent and merged into R (128) and the process returns to determine if UGF is set (118).

If the UGF is not set (118), then a determination is made if R is full (154). If it is, LR is set to be the last row in the R (150) and R is returned (152); if R is not full, then BTM is cleared (166), and the process returns to step (138), described above.

If the BTM is not set (130), then a determination is made if the STQM is set (136). If it is not, then the process continues from step (138), as discussed above; if it is, then the process continues from step (146), as discussed above.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention is claimed is:

1. An apparatus for executing a database query that comprises an inner join and returns rows with fields F, subject to a set of restrictions R, said apparatus comprising:
means for instantiating exactly one Query Execution Node (QEN) associated with each table participating in said query;
means for connecting, with a computer, the QENs to each other in a chain;
for each QEN in said chain, means for requesting rows from the previous QEN in said chain, if present;
means for performing a single-table query against the associated table using said requested rows, if present; and
means for passing the resulting rows from said single-table query to the next QEN in said chain; and
means for outputting, with said computer, a solution to said query that comprises the rows that are returned by the last QEN in said chain;
wherein a single-table query against a table t comprises three arguments I, $R_q$, and $F_p$, where:
I is a set of input rows comprising said requested rows, if present;
$R_q$ is the set of restrictions within R that operate on the fields indicated by $F_I \cup F_t$, where $F_I$ and $F_t$ are the sets of field names from I and t, respectively; and
$F_p$ is a set of field names from $F_I \cup F_t$ indicating the columns onto which results should be projected to yield said resulting rows;
wherein in response to a request for said requested rows, the $i^{th}$ QEN in said chain performs a single-table query against the associated table $t_i$ with arguments I, $R_q$ and $F_p$ equal to $I_{i-1}$, $R_i$, and $F_i$ respectively, where
$R_I$ is the set of restrictions containing all restrictions that can be applied using only fields from $t_I$, and
$F_I$ is the set of fields that either exist in F or in one of the remaining unused restrictions in R; and
wherein in response to a request for a said requested rows, the ith QEN in said chain performs a single-table query against the associated table $t_i$ with arguments I, $R_q$, and $F_p$ equal to $I_{i-1}$, $R_i$, and $F_i$, respectively, where
$I_{i-1}$ is said requested rows received from said previous QEN in said chain,
$R_i$ is the set of restrictions that have not been associated with a previous QEN in said chain and can be applied using only fields from table $t_i$ and $F_{i-1}$, and
$F_i$ is the set of fields that either exist in F or in one of the remaining unused restrictions in R.

2. The apparatus of claim 1, said single-table query additionally comprising two arguments c and S, where:
c is a Boolean value indicating whether duplicate rows should be culled from said single-table query results; and
S is an optional sequence of field names specifying the relative significance of the fields indicated by $F_p$ in determining a lexicographical ordering of results of said single-table query.

3. The apparatus of claim 1, further comprising:
paging parameters for specifying which portion of a single-table query result to retrieve, including a marker indicating a beginning of a page and a page size indicating a number of rows to return.

4. The apparatus of claim 1 further comprising:
means for constructing said QEN chain based upon a definition of each QEN's inputs and outputs and an association of every restriction supplied by said query.

5. The apparatus of claim 4, said means for constructing said QEN chain operating upon a sequence of said participating tables, said means for constructing said QEN chain proceeding iteratively from a first table of said participating tables to a last table of said participating tables.

6. The apparatus of claim 5, wherein upon completion of said QEN chain, all restrictions supplied by said inner join are associated with a QEN.

7. The apparatus of claim 1, further comprising:
means for culling duplicates across single-table queries.

8. The apparatus of claim 7, wherein said means for culling manipulates a sort order of rows to make duplicates appear adjacent to each other in a sequence of all rows across all pages, wherein identical rows are collapsed onto one.

9. The apparatus of claim 8, said means for culling defining a set of unperturbed fields, wherein all duplicates of a row are within an unperturbed group of rows, potentially returned by separate single-table queries, with unperturbed field values equaling those of said row, wherein a QEN collects all rows within said unperturbed group, sorts them, and removes duplicates.

10. The apparatus of claim 9, wherein said means for culling examines all rows in said unperturbed group before any row within said unperturbed group can be passed to a next QEN in said QEN chain.

11. The apparatus of claim 10, further comprising:
means for explicitly setting a QEN's position in its output stream to allow a QEN to seek backwards and output rows that it has already returned.

12. A computer-implemented method for executing a database query that comprises an inner join and returns rows with fields F, subject to a set of restrictions R, said computer-implemented method comprising the steps of:
instantiating exactly one Query Execution Node (QEN) associated with each table participating in said query;
connecting, with a computer, the QENs to each other in a chain;
for each QEN in said chain,
requesting rows from the previous QEN in said chain, if present;
performing a single-table query against the associated table using said requested rows, if present; and
passing the resulting rows from said single-table query to the next QEN in said chain; and
outputting, with said computer, a solution to said query that comprises the rows that are returned by the last QEN in said chain;
wherein a single-table query against a table t comprises three arguments I, $R_q$, and $F_p$, where:
I is a set of input rows comprising said requested rows, if present;
$R_q$ is the set of restrictions within R that operate on the fields indicated by $F_I \cup F_t$, where $F_I$ and $F_t$ are the sets of field names from I and t, respectively; and
$F_p$ is a set of field names from $F_I \cup F_t$ indicating the columns onto which results should be projected to yield said resulting rows;
wherein in response to a request for said requested rows, the $i^{th}$ QEN in said chain performs a single-table query against the associated table $t_i$ with arguments I, $R_q$ and $F_p$ equal to $I_{i-1}$, $R_i$, and $F_i$ respectively, where
$R_I$ is the set of restrictions containing all restrictions that can be applied using only fields from $t_I$, and
$F_I$ is the set of fields that either exist in F or in one of the remaining unused restrictions in R; and
wherein in response to a request for a said requested rows, the ith QEN in said chain performs a single-table query against the associated table $t_i$ with arguments I, $R_q$, and $F_p$ equal to $I_{i-1}$, $R_i$, and $F_i$, respectively, where
$I_{i-1}$ is said requested rows received from said previous QEN in said chain,
$R_i$ is the set of restrictions that have not been associated with a previous QEN in said chain and can be applied using only fields from table $t_i$, and $F_{i-1}$, and
$F_i$ is the set of fields that either exist in F or in one of the remaining unused restrictions in R.

13. The method of claim 12, said single-table query additionally comprising two arguments c and S, where:
  c is a boolean value that indicates whether duplicate rows should be culled from said single-table query result; and
  S is an optional sequence of field names specifying the relative significance of the fields indicated by $F_p$ in determining a lexicographical ordering of results of said single-table query.

14. The method of claim 12, further comprising the step of:
  providing paging parameters for specifying which portion of a single-table query result to retrieve, including a marker indicating a beginning of a page and a page size indicating a number of rows to return.

15. The method of claim 12, further comprising the step of:
  constructing said QEN chain based upon a definition of each QEN's inputs and outputs and an association of every restriction supplied by said query.

16. The method of claim 15, said constructing step comprising the step of:
  operating upon a sequence of said participating tables, said constructing step proceeding iteratively from a first table of said participating tables to a last table of said participating tables.

17. The method of claim 16, wherein upon completion of said QEN chain, all restrictions supplied by said query are associated with a QEN.

18. The method of claim 12, further comprising the step of:
  culling duplicates across single-table queries.

19. The method of claim 18, wherein said culling step further comprises the step of:
  manipulating a sort order of rows to make duplicates appear adjacent to each other in a sequence of all rows across all pages, wherein identical rows are collapsed onto one.

20. The method of claim 19, said culling step further comprises the step of:
  defining a set of unperturbed fields, wherein all duplicates of a row are within an unperturbed group of rows, potentially returned by separate single-table queries, with unperturbed field values equaling those of said row, wherein a QEN collects all rows within said unperturbed group, sorts them, and removes duplicates.

21. The method of claim 20, wherein said culling step further comprises the step of:
  examining all rows in said unperturbed group before any row within said unperturbed group can be passed to a next QEN in said QEN chain.

22. The method of claim 21, further comprising the step of:
  explicitly setting a QEN's position in its output stream to allow a QEN to seek backwards and output rows that it has already returned.

\* \* \* \* \*